United States Patent [19]

Hanzawa et al.

[11] Patent Number: 5,252,397
[45] Date of Patent: Oct. 12, 1993

[54] MODIFIED POLYESTER RESIN AND HOT-MELT-ADHESIVE CONJUGATE FIBERS USING THE SAME

[75] Inventors: Fusao Hanzawa, Ichiharashi; Takayoshi Nakajima, Shigaken; Masahiro Yokota, Ichiharashi; Kazuyoshi Kimura, Ichiharashi; Mamoru Fujita, Ichiharashi; Seiji Ide, Ichiharashi, all of Japan

[73] Assignee: Chisso Corporation, Osaka, Japan

[21] Appl. No.: 945,710

[22] Filed: Sep. 16, 1992

Related U.S. Application Data

[63] Continuation of Ser. No. 757,806, Sep. 11, 1991, abandoned.

[30] Foreign Application Priority Data

Sep. 28, 1990 [JP]  Japan .................. 2-260272

[51] Int. Cl.$^5$ .............................. D02G 3/00
[52] U.S. Cl. ................... 428/373; 528/272; 528/302; 528/308; 528/308.6; 525/437; 525/445; 525/448; 525/902; 428/364; 428/480; 428/483
[58] Field of Search ............ 528/272, 302, 308, 308.6; 525/437, 445, 448, 902; 428/364, 373, 480, 483

[56] References Cited

U.S. PATENT DOCUMENTS

| | | | |
|---|---|---|---|
| 3,699,187 | 10/1972 | Gardziella | 525/444 |
| 4,136,089 | 1/1979 | Bier et al. | 528/309 |
| 4,851,284 | 7/1989 | Yamanoi et al. | 428/284 |
| 4,996,291 | 2/1991 | Yoshinaka et al. | 528/272 |

FOREIGN PATENT DOCUMENTS 1495625 4/1969 Fed. Rep. of Germany .
2096048 10/1982 United Kingdom .

OTHER PUBLICATIONS

Chemical Abstracts vol. 114, No. 8, Feb. 25, 1991; Abstract No. 6391w; JP A 2235920; Sep. 18, 1990.
Chemical Abstracts vol. 113, No. 2, Jan. 30, 1990; Abstract No. 7797a; JP A 2028244.
Chemical Abstracts vol. 112, No. 4, Apr. 2, 1990; Abstract No. 120254p; JP A 1235636, Sep. 20, 1989.
World Patents Index Latest; Derwent Publications Ltd., London, GB; Database WPIL, Accession No. 90-346168; & JP A 2251612.
World Patents Index Latest; Derwent Publications Ltd., London, GB; Database WPIL, Accession No. 90-087801; & JP A 2041416.

Primary Examiner—Samuel A. Acquah
Attorney, Agent, or Firm—Leydig, Voit & Mayer

[57] ABSTRACT

Hot-melt-adhesive conjugate fibers consisting of a fiber-forming component and an adhesive component are provided, with at least one of the fiber-forming component and the adhesive component being a low-melting, modified polyester resin obtained by subjecting to polycondensation, a diol component consisting of 3 to 40 molar % of a 2,2-dialkyl-substituted-1,3-propanediol and 60 to 97 molar % of ethylene glycol and/or 1,4-butanediol, and an aromatic dicarboxylic acid, said low-melting, modified polyester resin having a melting point range between the melting point of polyethylene and a temperature at least 20° C. lower than the melting point of highly crystalline polyethylene terephthalate.

5 Claims, No Drawings

MODIFIED POLYESTER RESIN AND HOT-MELT-ADHESIVE CONJUGATE FIBERS USING THE SAME

This application is a continuation of application Ser. No. 07/757,806, filed Sep. 11, 1991, now abandoned.

BACKGROUND OF THE INVENTION

1. Field of the Invention

This invention relates to a low-melting modified polyester resin capable mainly of notably reducing ply separation of hot-melt-adhesive conjugate fibers, and hot-melt-adhesive composite fibers using the above resin. More particularly, the invention relates to a low-melting, modified polyester resin capable of affording conjugate fibers having a broad hot-melt-adhesive temperature range and also having a high breaking strength. This invention is particularly useful in the case where the polyester resin is used as a part of or in place of the components of conventional hot-melt-adhesive conjugate fibers which is subjected to hot-melt-adhesive used, for example in the fields of paper diaper, hygienic goods, etc.

2. Description of the Related Art

Processes for producing non-woven fabrics by utilizing hot-melt adhesion of a low-melting component of conjugate fibers consisting of a plurality of polymers having different melting points have already been known. Such processes are suitable mainly for producing non-woven fabrics having a medium or low basis weight.

Japanese patent publication No. Sho 55-17807 discloses polyolefin conjugate fibers whose fiber-forming component is polypropylene and the adhesive component of which is polyethylene. However, such fibers have a relatively small difference in the melting points of the two components so that the temperature range in which hot-melt adhesion can be carried out in a state of low percentage of heat shrinkage is so narrow that a precise temperature control is required for producing non-woven fabrics.

Further, Japanese patent application laid-open No. Sho 57-176217 discloses conjugate fibers whose fiber-forming component is a polyester and the adhesive component of which is polypropylene or polyethylene. Since the fibers have a large difference in the melting points of the two components, the fibers have an advantage that the range of the hot-melt adhesion temperature is far broader than that of the above polyolefin conjugate fibers, but on the other hand, the compatibility between the polyester and the polyolefin is inferior so that there is a drawback that the two components are liable to peel off from each other. Further, since the conjugate fibers are heat-treated in advance in order to prevent shrinkage at the time of hot-melt adhesion, there are drawbacks that the fibers are in a state of being more readily peeled off from each other. Thus non-woven fabrics produced from such conjugate fibers possess a low stiffness. Consequently after a load has been repeatedly applied onto the fibers, the resulting fibers exhibit inferior restoration properties and low frictional resistance. Also when the fibers are peeled off the polyethylene is separated into powder.

Further, Japanese patent publication No. Hei 1-20249 discloses conjugate fibers obtained by hot-melt-adhering a fiber-forming component consisting of a copolymer of a modified polyolefin containing carboxyl group with a polyamide and a polyester and an adhesive component consisting of a modified polyolefin containing carboxyl group and an unmodified polyolefin or the mixture of the two. In the case of such fibers, problems so far raised are considerably overcome, that is, ply separation is difficult to occur and further, the temperature range of hot-melt-adhesion becomes broader. However, quality improvement in conjugate fibers used for paper diaper, hygienic goods, etc. has now been more and more required. In particular, the breaking strength of non-woven fabrics is still insufficient so that more improvement therein has been desired.

Thus, the present inventors have made extensive research in order to overcome the above-mentioned drawbacks of hot-melt-adhesive conjugate fibers, and as a result have achieved the present invention.

SUMMARY OF THE INVENTION

The present invention resides in a low-melting, modified polyester resin obtained by subjecting to polycondensation, a diol component consisting of 3 to 40 molar % of a 2,2-alkyl-substituted-1,3-propanediol and 60 to 97 molar % of ethylene glycol and/or 1,4-butanediol, and an aromatic dicarboxylic acid, said low-melting, modified polyester resin having a melting point range between the melting point of polyethylene and a temperature lower by at least 20° C. than the melting point of highly crystalline polyethylene terephthalate, and hot-melt-adhesive conjugate fibers using said low-melting, modified polyester resin as at least one of the fiber-forming component and the adhesive component constituting said hot-melt-adhesive conjugate fibers.

DETAILED DESCRIPTION OF PREFERRED EMBODIMENTS

As to the 2,2-dialkyl-substituted-1,3-propanediol specifically used as one of the diol components, the alkyl group therein is selected from the group consisting of ethyl group, propyl group, butyl group and pentyl group, and concrete examples of the propanediol are 2,2-diethyl-1,3-propanediol, 2-butyl-2-ethyl-1,3-propanediol and 2-pentyl-2-propyl-1,3-propanediol. These may be used alone or in combination, depending upon their use object.

The reason that the quantity of the 2,2-alkyl-substituted-1,3-propanediol used in the present invention is limited to within the range of 3 to 40 molar % in the diol component is as follows:

If the quantity is less than 3 molar %, the melting point of the resulting modified polyester resin becomes a high melting temperature very close to that of highly crystalline polyethylene terephthalate. For example, when hot-melt-adhesion is carried out using highly crystalline polyethylene terephthalate as the fiber-forming component and using the resulting modified polyester resin as the adhesive component, the temperature range in which hot-melt-adhesion can be carried out becomes very narrow; hence when a non-woven fabric is produced, a very precise temperature control is required. On the other hand, if the quantity exceeds 40 molar %, the melting point of the resulting modified polyester resin is very close to or lower than that of polyethylene; thus, hot-melt-adhesive conjugate fibers obtained using such modified polyester resin as a component are inferior in the spinnability.

Next, as the aromatic dicarboxylic acid subjected to polycondensation with the diol component, terephthalic acid and isophthalic acid are suitable, and terephthalic acid and terephthalic acid containing less than 20 molar % of isophthalic acid are particularly preferred. Namely, if the content of terephthalic acid is less than 80 molar % (i.e. the content of isophthalic acid is 20 molar % or more), the melting point of the resulting modified polyester resin is very close to or lower than that of polyethylene; thus, if hot-melt-adhesive fibers obtained by using such a polyester resin as a component are made up into a non-woven fabric, the breaking strength of the fabric is notably reduced. In the present invention, the polycondensation reaction of the diol component with the aromatic dicarboxylic acid may be carried out according to known process, without needing any particular apparatus, catalyst, additive, etc. The low-melting, modified polyester resin of the present invention obtained according to the above polycondensation reaction is effective as a component of hot-melt-adhesive conjugate fibers. Namely, in the case of hot-melt-adhesive conjugate fibers consisting of a fiber-forming component and an adhesive component, the low-melting, modified polyester resin of the present invention may be used as at least one of the fiber-forming component and the adhesive component. Thus, it does not matter if the fiber-forming component and the adhesive component are respectively the low-melting, modified polyester resins having different melting points.

Further, depending upon the use object of hot-melt-adhesive conjugate fibers, it does not matter if the fiber-forming component is a mixed component such as that of highly crystalline polyethylene terephthalate with the low-melting, modified polyester resin of the present invention. In this case, the mixed component may be arranged into a side-by-side type to form a fiber-forming component, or the higher melting component in the mixed component may be arranged as a core component and the lower melting component therein may be arranged as a sheath component, to form a fiber-forming component.

The hot-melt-adhesive conjugate fibers of the present invention may be obtained by conjugate spinning, using a conventional spinneret, and arranging the above fiber-forming component and adhesive component into a side-by-side type or arranging the components into a sheath-and-core type in which the adhesive component is arranged as a sheath component, and the resulting fibers may be, if desired, subjected to stretching, crimping, cutting or the like treatment and used in the form of filaments or staple fibers.

EFFECTIVENESS OF THE INVENTION

The low-melting, modified polyester resin of the present invention makes it possible to notably reduce the ply separation of the fiber-forming component and the adhesive component of the hot-melt-adhesive conjugate fibers as compared with conventional ones.

Further, the hot-melt-adhesive conjugate fibers of the present invention using the low-melting, modified polyester resin have a broad hot-melt-adhesion temperature range, and the fibers may be mixed with other fibers such as those of polyesters or polyolefins so far regarded as having intrinsically an inferior compatibility with polyesters, and made up into non-woven fabrics according to hot-melt-adhesion process. Non-woven fabrics obtained by using the hot-melt-adhesive conjugate fibers of the present invention have almost no ply separation of the fiber-forming component and the adhesive component; hence they have a specific feature of having a far higher breaking strength than conventional ones, and moreover, they have advantages of a superior stiffness, restoration properties after compression, etc.

EXAMPLE

The present invention will be described in more details by way of Examples and Comparative examples, but it should not be construed to be limited thereto. In addition, the evaluation methods of physical properties carried out in these examples are as follows:

(a) Breaking strength

Sample fibers obtained by applying mechanical crimping (10 crimp/25 mm) to the hot-melt-adhesive conjugate fibers and cutting to a fiber length of 64 mm are passed through a carding machine to obtain a web having a basis weight of 100 g/m$^2$, followed by cutting off a sample piece of 25 cm×25 cm in longitudinal and lateral lengths, from the above web, heat-treating the sample piece at a definite temperature of 140° to 200° C. for 5 minutes to prepare a non-woven fabric of about 7 mm thick, cutting off a test piece of 5 cm wide and 15 cm long from the non-woven fabric, and measuring its breaking strength (Kg/5 cm) at a gripping distance of 10 cm and at a stretching rate of 10 cm/min according to JIS L 1096.

(b) Feeling

With the above non-woven fabric, its feeling was judged by 5 panelors. The case where all of the five panelors judged that it was good, was designated by a symbol of ◯; the case where 3 to 4 panelors judged that it was good, was designated by a symbol of Δ; and the case where 3 panelors or more judged that it was inferior, was designated by a symbol of ×.

(c) Restoration properties

On the above non-woven fabric the thickness of which was measured in advance (a cm), was dropped in impactor of 5 cm in diameter and 1 Kg in weight, covered by a flat rubber having a bottom surface of a hardness of 60 Hs according to JIS K 6301A method, from a position of a height of 20 cm, 1,000 times at a rate of 195 times per minute, followed by allowing the resulting fabric to stand for 5 minutes and measuring its thickness (b cm).

The case where the percentage of thickness reduction (%) according to the following equation was less than 5% was judged to be good, the case where the percentage was 5 to 10% was judged to be passable, and the case where the percentage exceeded 10% was judged to be bad, and these cases were designated by symbols ◯, Δ and ×, respectively:

*Percentage of thickness reduction*
$$(\%) = (1 - b/a) \times 100.$$

(d) Frictional resistance

The sample piece subjected to the test of restoration properties was observed by a microscope. The test piece having many occurrences of peeling off, that having few occurrences and that having no occurrence were judged to be bad, passable and good, respectively, and designated as symbols ×, Δ and ◯, respectively.

EXAMPLE (PREPARATION EXAMPLE) 1

Into a 2 l capacity glass separable flask equipped with a thermometer, a stirrer, a nitrogen gas-feeding tube and a condenser, were fed terephthalic acid (hereinafter abbreviated to TPA) (830 g, 5.0 mols), ethylene glycol (hereinafter abbreviated to EG) (465 g, 7.5 mols) and 2-butyl-2-ethyl-1,3-propanediol (hereinafter abbreviated to DMH) (24 g, 0.15 mol), followed by further adding calcium acetate (0.44 g) as an esterification catalyst and antimony trioxide (0.73 g) as a high-polymerization catalyst, and reacting the mixture under the atmospheric pressure, at 150° to 220° C. for 10 hours while passing $N_2$ gas, distilling off generated water (179 g) during the reaction, thereafter reducing the pressure of the reaction system by means of a vacuum pump, distilling off excess glycol (EG) (164 g) inside the reaction system at 220° to 280° C. for 5 hours to obtain a modified polyester resin of the present invention (hereinafter referred to as PEPO-1) (975 g). As a result of differential scanning calorimetry analysis (DSC), this PEPO-1 had a melting point of 237° C.

EXAMPLES (PREPARATION EXAMPLES) 2–5

Example 1 was repeated except that the kinds of the aromatic dicarboxylic acid and the diol components and/or the composition were varied, to prepare modified polyester resins.

Namely, in Preparation example 2, TPA (830 g, 0.5 mol), EG (372 g, 6.0 mols), 2,2-diethyl-1,3-propanediol (hereinafter abbreviated to DMP) (99 g, 0.75 mol) and 2-pentyl-2-propyl-1,3-propanediol (hereinafter abbreviated to DMN) (188 g, 1.0 mol) were fed and generated water (179 g) and excess glycol (EG) (170 g) were distilled off to obtain a modified polyester resin having a melting point of 170° C. (hereinafter referred to as PEPO-2).

In Preparation example 3, TPA (830 g, 5.0 mols), 1,4-butanediol (hereinafter abbreviated to BG) (540 g, 6.0 mols), DMP (33 g, 0.25 mol), DMH (40 g, 0.25 mol) and DMN (47 g, 0.25 mol) were fed and generated water (178 g) and excess glycol (EG) (157 g) were distilled off to obtain a modified polyester resin having a melting point of 198° C. (hereinafter referred to as PEPO-3).

In Preparation example 4, TPA (789 g, 4.75 mols), isophthalic acid (hereinafter abbreviated to IPA) (42 g, 0.25 mol EG (403 g, 6.5 mols) and DMH (120 g, 0.75 mol) were fed and generated water (179 g) and excess glycol (EG) (139 g) were distilled off to obtain a modified polyester resin having a melting point of 189° C. (hereinafter referred to as PEPO-4).

In Preparation example 5, TPA (664 g, 4.0 mols), IPA (166 g, 1.0 mol), EG (279 g, 4.5.mols) BG (203 g, 2.25 mols) and DMH (80 g, 0.5 mol) were fed and generated water (178 g) and excess glycol (EG) (138 g) were distilled off to obtain a modified polyester resin having a melting point of 162° C. (hereinafter referred to as PEPO-5).

COMPARATIVE EXAMPLE (COMPARATIVE PREPARATION EXAMPLE) 1

A modified polyester resin having a composition outside the range of the composition of the present invention was prepared in the same manner as in Example 1. Namely, TPA (830 g, 5.0 mols EG (310 g, 5.0 mols), DMP (165 g, 1.25 mol), and DMH (200 g, 1.25 mol) were fed and generated water (178 g) and excess glycol (EG) (151 g) were distilled off to obtain a modified polyester resin having a melting point of 118° C. (hereinafter referred to as PEPO-6).

The foregoing is summarily shown in Table 1. In addition, for comparison with the modified polyester resin of the present invention, commercially available fiber grade highly crystalline polyethylene terephthalate (hereinafter abbreviated to PET-1) is also shown in Table 1.

EXAMPLE 6

Melt-spinning was carried out using commercially available highly crystalline polyethylene terephthalate (PET-1) as a fiber-forming component (core component) and the modified polyester resin (PEPO-1) of the present invention as an adhesive component (sheath component) and employing a sheath-and-core type conjugate spineret (hole diameter: 0.6 mm and number of holes: 350), in a conjugate ratio of 50/50 at a spinning temperature of 270° C. to obtain unstretched filaments of 10 d/f, followed by stretching the unstretched filaments to 3.5 times the original length at 80° C., applying crimping (10 crimps/25 mm) with a stuffer box and cutting to a fiber length of 64 mm to obtain staple fibers of 3d/f×64 mm, having superior spinnability and stretchability.

The above staple fibers were passed through a carding machine to obtain a web having a basis weight of 100 g/m², followed by subjecting this web to heat treatment using a suction drier at 240° C. for 5 minutes to prepare a non-woven-fabric.

The results are shown in Table 2. The resulting non-woven fabric exhibited a good feeling, and values of breaking strength and restoration properties as superior as 38 Kg/5 cm and less than 5%, respectively.

EXAMPLES 7–13

The steps of conjugate spinning to heat treatment were carried out in the same manner as in Example 6, using the stocks of the kinds shown in the symbol in Table 1, as a fiber-forming component and/or an adhesive component, to obtain non-woven fabrics. The results are shown in Table 2. In any of these Examples, the resulting non-woven fabrics exhibited a good feeling same as in Example 6 and superior values of breaking strength and restoration properties.

COMPARATIVE EXAMPLES 2–4

As examples of conventional, hot-melt-adhesive conjugate fibers, highly crystalline polyethylene terephthalate/polyethylene conjugate fibers (Comparative example 2) and highly crystalline polyethylene terephthalate/polypropylene conjugate fibers (Comparative example 4) were subjected to tests of spinnability and physical properties of non-woven fabric. Further, conjugate fibers of a modified polyester resin (PEPO-6) having a composition outside the range of the present invention were similarly tested (Comparative example 3). The results are shown together in Table 2. In both of the cases of Comparative examples 2 and 4, the resulting non-woven fabrics exhibited a good feeling, but the restoration properties and frictional resistance were inferior.

Further, in the case of Comparative example 3, the spinnability was inferior so that stretched yarns capable of being processed into a non-woven fabric could not been obtained.

TABLE 1

| Symbol | Compositions of low-melting, modified polyester resins (mol %) ||||||| M.P. (°C.) |
| | Aromatic dicarboxylic acid || Diol component ||||| |
| | IPA | TPA | EG | BG | DMP | DMH | DMN | |
| --- | --- | --- | --- | --- | --- | --- | --- | --- |
| PEPO-1 | — | 100 | 97 | — | — | 3 | — | 237 |
| PEPO-2 | — | 100 | 65 | — | 15 | — | 20 | 170 |
| PEPO-3 | — | 100 | — | 85 | 5 | 5 | 5 | 198 |
| PEPO-4 | 5 | 95 | 85 | — | — | 15 | — | 189 |
| PEPO-5 | 20 | 80 | 45 | 45 | — | 10 | — | 162 |
| PEPO-6 | — | 100 | 50 | — | 25 | 25 | — | 118 |
| PET-1 | — | 100 | 100 | — | — | — | — | 258 |

TABLE 2

| | Hot-melt-adhesive conjugate fibers ||||| Non-woven fabric |||| |
| | Fiber-forming component | Adhesive component | Conjugate type | Fineness d/f | Spin-ability | Heat treatment temp. (°C.) | Breaking strength kg/5 cm | Feeling | Restoration properties | Frictional resistance |
| --- | --- | --- | --- | --- | --- | --- | --- | --- | --- | --- |
| Example 6 | PET-1 | PEPO-1 | Sheath-core | 3 | Good | 240 | 38 | O | O | O |
| Example 7 | PET-1 PEPO-1 | PEPO-2 | Sheath-core | 3 | Good | 170 | 35 | O | O | O |
| Example 8 | PET-1 | PEPO-3 | Sheath-core | 3 | Good | 200 | 37 | O | O | O |
| Example 9 | PEPO-1 | PEPO-4 | Sheath-core | 4 | Good | 190 | 37 | O | O | O |
| Example 10 | PET-1 PEPO-3 | PEPO-5 | Side by side | 4 | Good | 170 | 39 | O | O | O |
| Example 11 | PET-1 PEPO-3 | Poly-ethylene | Sheath-core | 3 | Good | 160 | 35 | O | O | O |
| Example 12 | PET-1 PEPO-4 | Poly-propylene | Sheath-core | 3 | Good | 170 | 34 | O | O | O |
| Example 13 | PEPO-1 PEPO-2 | Poly-ethylene | Sheath-core | 4 | Good | 160 | 35 | O | O | O |
| Comp. ex. 2 | PET-1 | Poly-ethylene | Sheath-core | 3 | Good | 160 | 11 | O | Δ | Δ |
| Comp. ex. 3 | PET-1 | PEPO-6 | Sheath-core | 3 | Bad | 150 | — | — | — | — |
| Comp. ex. 4 | PET-1 | Polypropylene | Sheath-core | 4 | Good | 170 | 9 | O | Δ | Δ |

What we claim is:

1. Hot-melt-adhesive conjugate fibers consisting of a fiber-forming component and an adhesive component, at least one of said fiber-forming component and said adhesive component being a low-melting, modified polyester resin obtained by subjecting to polycondensation, a diol component consisting of 3 to 40 molar % of a 2,2-dialkyl-substituted-1,3-propanediol and 60 to 97 molar % of ethylene glycol and/or 1,4-butanediol, and an aromatic dicarboxylic acid, said low-melting, modified polyester resin having a melting point range between the melting point of polyethylene and a temperature at least 20° C. lower than the melting point of highly crystalline polyethylene terephthalate.

2. Hot-melt-adhesive conjugate fibers according to claim 1 wherein said adhesive component is polyethylene.

3. Hot-melt-adhesive conjugate fibers according to claim 1 wherein said adhesive component is polypropylene.

4. Hot-melt-adhesive conjugate fibers according to claim 1 wherein said fiber-forming component and said adhesive component are arranged so as to form a side-by-side type.

5. Hot-melt-adhesive conjugate fibers according to claim 1 wherein said fiber-forming component is arranged so as to form a core component and said adhesive component is arranged so as to form a sheath component.

* * * * *